United States Patent
Tsuda et al.

(10) Patent No.: US 10,288,933 B2
(45) Date of Patent: May 14, 2019

(54) DUAL IMAGE AND MIRROR DISPLAY DEVICE

(71) Applicant: Panasonic Liquid Crystal Display Co., Ltd., Himeji-shi, Hyogo (JP)

(72) Inventors: Kazuhiko Tsuda, Hyogo (JP); Katsuji Tanaka, Hyogo (JP)

(73) Assignee: Panasonic Liquid Crystal Display Co., Ltd., Hyogo (JP)

( * ) Notice: Subject to any disclaimer, the term of this patent is extended or adjusted under 35 U.S.C. 154(b) by 0 days.

(21) Appl. No.: 15/476,258

(22) Filed: Mar. 31, 2017

(65) Prior Publication Data

US 2018/0284506 A1  Oct. 4, 2018

(51) Int. Cl.
*G02F 1/1335* (2006.01)
*G02F 1/1347* (2006.01)

(52) U.S. Cl.
CPC .... *G02F 1/133553* (2013.01); *G02F 1/13471* (2013.01); *G02F 1/133536* (2013.01); *G02F 2001/133545* (2013.01)

(58) Field of Classification Search
CPC ............ G02F 1/1347; G02F 1/133514; G02F 1/1368; G02F 1/133536; G02F 1/133528; G02F 2001/13478; G02F 2203/02; G02F 2001/133302; G02F 1/13439; G02F 1/1362; G02F 1/136209; G02F 1/136227; G02F 1/1365; G02F 2001/136218; G02F 2001/136222; G02F 2001/136231; G02F 2001/13625; G02F 2001/1635; G02F 2201/122; G02F 2202/10; G02F 1/0311; G02F 1/116; G02F 1/1335; G02F 1/133533; G02F 1/13362; G02F 2001/133531; G02F 2001/133521; G02F 2001/13356; G02F 2001/133538; G02F 2001/133541; G02F 2001/133543; G02F 2001/133545; G02F 2001/133548; G02F 2001/13355; G02F 2001/133562; G02F 2001/133567; G02F 2203/16; G02F 2201/34; G02F 2201/343;
(Continued)

(56) References Cited

U.S. PATENT DOCUMENTS

| | | |
|---|---|---|
| 7,495,719 B2 | 2/2009 | Adachi et al. |
| 2004/0100598 A1* | 5/2004 | Adachi ............ G02F 1/133536 349/113 |
| 2005/0162591 A1* | 7/2005 | Hashimoto ....... G02F 1/133502 349/113 |
| 2006/0187183 A1* | 8/2006 | Naka .................... G09G 3/3406 345/102 |

(Continued)

*Primary Examiner* — Shan Liu
(74) *Attorney, Agent, or Firm* — Hamre, Schumann, Mueller & Larson, P.C.

(57) ABSTRACT

A device capable of switching between an image display state and a mirror state is provided. The device includes an image display portion and a mirror portion. The image display portion emits image light for displaying a desired image and includes a display panel. The mirror portion is superposed on the image display portion and can switch between an image transmittance state for transmitting image light and a mirror state for reflecting outside light. The mirror portion includes a liquid crystal layer disposed between a first glass substrate and a second glass substrate and a reflective polarization layer adhered to the second glass substrate. A reflective enhancement layer separate from the reflective polarization layer is disposed between the display panel and the liquid crystal layer and has a refractive index that is different from the refractive index of the second glass substrate.

4 Claims, 4 Drawing Sheets

(58) Field of Classification Search
CPC ......... G02F 2201/346; G02F 1/133555; G02F 2001/133557; G02F 1/133553; G02F 1/1343; G02F 1/13478; G02F 1/0063; G02F 1/13718; H01L 2021/775; H01L 27/1214; H01L 27/2436; H01L 29/66037; H01L 29/66068; H01L 29/66227; H01L 29/72; H01L 29/786; H01L 2924/1304; H01L 51/0504; H01L 51/0508; H01L 51/5293; B29D 11/00644; B32B 17/10458; B32B 2307/42; H01R 12/7005; H04B 10/532; G01J 5/0825; G02B 5/3033; G02B 6/0056; G02B 6/02109; G03F 9/7065; G01R 33/3678; C09K 19/0208; B60R 1/088; B60R 1/08
USPC ............... 349/42–43, 96–103, 113–115, 195
See application file for complete search history.

(56) References Cited

U.S. PATENT DOCUMENTS

| | | | | |
|---|---|---|---|---|
| 2006/0227267 | A1* | 10/2006 | Ikadai | G02F 1/133555 349/114 |
| 2010/0046059 | A1* | 2/2010 | McCabe | B60R 1/12 359/267 |
| 2011/0062481 | A1* | 3/2011 | Oyamada | B82Y 20/00 257/98 |
| 2012/0176563 | A1* | 7/2012 | Adachi | G02F 1/133536 349/62 |
| 2014/0036339 | A1* | 2/2014 | Tonar | B32B 27/06 359/267 |
| 2014/0312354 | A1* | 10/2014 | Nakahara | G02F 1/133553 257/72 |
| 2015/0232034 | A1* | 8/2015 | Weller | B60R 1/12 348/148 |

* cited by examiner

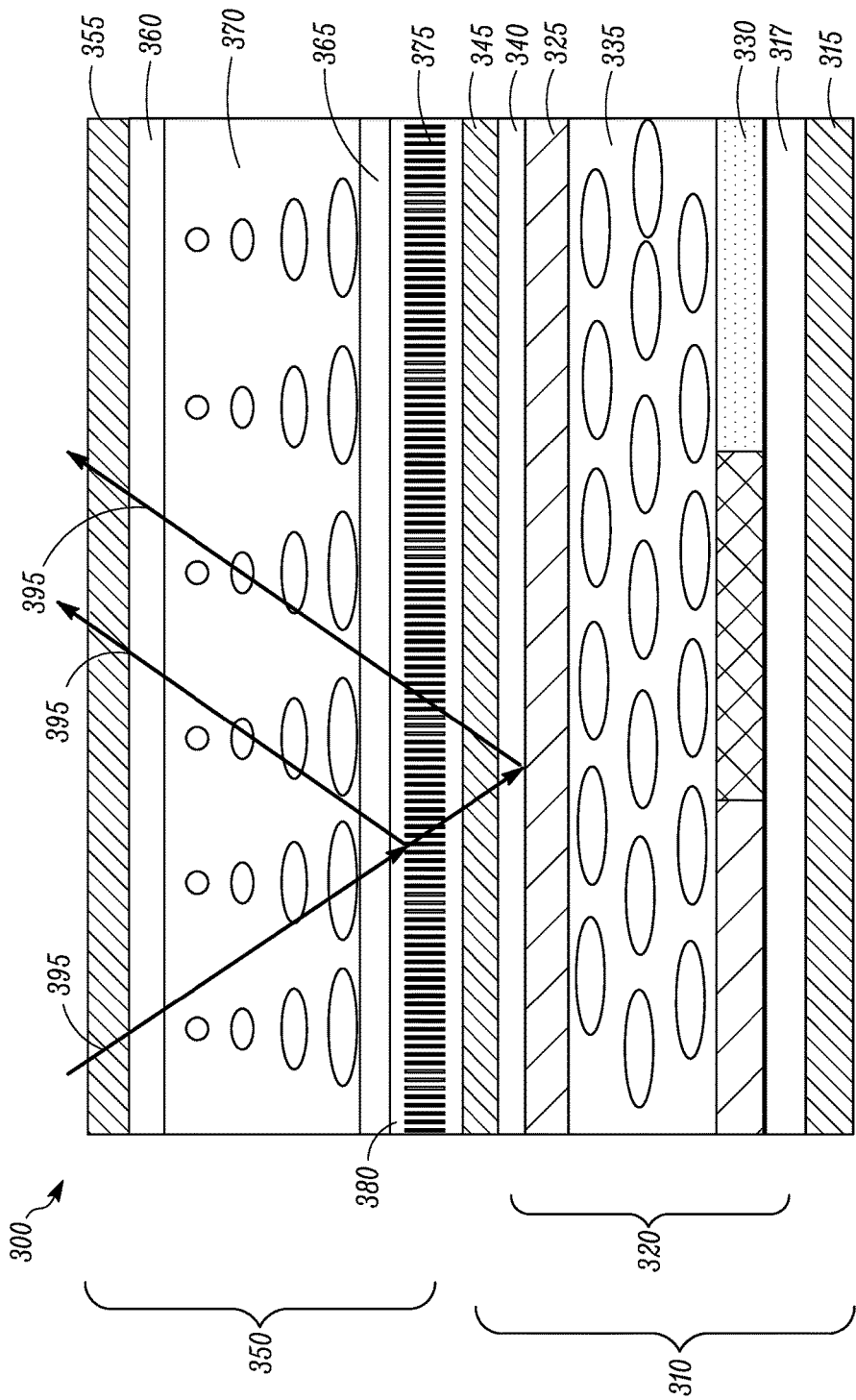

DUAL IMAGE AND MIRROR DISPLAY DEVICE

FIELD

The embodiments described herein are directed to an improved display device capable of switching between an image display state and a mirror state.

BACKGROUND

Display devices in which a half mirror material is disposed on a front surface of an image display member, such as a liquid crystal display device, and are capable of switching to a mirror status that reflects outside light (or a mirror disposed with a display function) are known. In a mirror state, such as when a lighting system is turned off or when an image is a dark display, outside light reflected by the half mirror material becomes greater than image light transmitted through the half mirror material. In an image display state, when the lighting system is turned on or when an image is a bright display, the image light transmitted through the half mirror material becomes greater than the outside light reflected by the half mirror material. That is, in these display devices, it is possible to change the same viewing screen between a mirror state and an image display state by switching the brightness of the image display member at the half mirror material rear surface.

SUMMARY

The embodiments described herein are directed to an improved display device capable of switching between an image display state and a mirror state. In particular, the embodiments described herein provide a display device with a mirror portion and an image display portion with improved reflectivity, particularly when operating in a mirror state.

In some embodiments, the reflectivity of the display device can be improved by providing a reflective enhancement layer that is separate from a reflective polarization layer. The reflective enhancement layer has a refractive index that is different from a refractive index of the glass substrate upon which the reflective polarization layer is adhered. In one embodiment, the reflective enhancement layer can be disposed between the glass substrate and the reflective polarization layer. In another embodiment, the reflective enhancement layer can be disposed between a display panel of the image display portion and the reflective polarization layer.

In some embodiments, the reflectivity of the display device can be improved by providing a reflective thin film transistor (TFT) substrate as part of the image display portion and positioning the reflective TFT substrate between a mirror liquid crystal layer and an image liquid crystal layer. The reflective TFT substrate includes a plurality of lines formed with at least one of aluminum and silver.

In one embodiment, a device capable of switching between an image display state and a mirror state is provided. The device includes an image display portion, a mirror portion, and a reflective enhancement layer. The image display portion emits image light for displaying a desired image. The image display portion includes a first polarization layer and a display panel. The mirror portion is superposed on the image display portion and is capable of being switched between an image transmittance state that transmits the image light and a mirror state that reflects outside light. The mirror portion includes a second polarization layer, a first glass substrate disposed adjacent to the second polarization layer, a second glass substrate, a first liquid crystal layer disposed between the first glass substrate and the second glass substrate, and a reflective polarization layer adhered to the second glass substrate. The reflective enhancement layer is separate from the reflective polarization layer and is disposed between the display panel and the first liquid crystal layer. The reflective enhancement layer has a refractive index that is different from the refractive index of the second glass substrate.

In another embodiment, a device capable of switching between an image display state and a mirror state is provided. The device includes an image display portion and a mirror portion. The image display portion emits image light for displaying a desired image. The image display portion includes a first polarization layer, a TFT substrate, a color filter substrate, a first liquid crystal layer disposed between the color filter substrate and the TFT substrate, and a second polarization layer. The TFT substrate and the color filter substrate are disposed between the first polarization layer and the second polarization layer. The mirror portion opposes the image display portion and is capable of being switched between an image transmittance state that transmits the image light and a mirror state that reflects outside light. The mirror portion includes a third polarization layer, a first glass substrate disposed adjacent to the third polarization layer, a second glass substrate, a second liquid crystal layer disposed between the first glass substrate and the second glass substrate, and a reflective polarization layer. The first glass substrate and the second glass substrate are disposed between the third polarization layer and the reflective polarization layer. The TFT substrate includes a plurality of lines being formed with at least one of aluminum and silver. The TFT substrate is positioned between the first liquid crystal layer and the second liquid crystal layer.

BRIEF DESCRIPTION OF THE DRAWINGS

References are made to the accompanying drawings that form a part of this disclosure, and which illustrate embodiments in which the systems and methods described in this specification can be practiced.

FIG. 3 illustrates a cross-sectional view of a display device according to a third embodiment.

Like reference numbers represent like parts throughout.

DETAILED DESCRIPTION

The embodiments described herein are directed to an improved display device display device capable of switching between an image display state and a mirror state. In particular, the embodiments described herein provide a display device with a mirror portion and an image display portion with improved reflectivity, particularly when operating in a mirror state.

In some embodiments, the reflectivity of the display device can be improved by providing a reflective enhancement layer that is separate from a reflective polarization layer. The reflective enhancement layer has a refractive index that is different from a refractive index of the glass substrate upon which the reflective polarization layer is adhered. In one embodiment, the reflective enhancement layer can be disposed between the glass substrate and the reflective polarization layer. In another embodiment, the reflective enhancement layer can be disposed between a display panel of the image display portion and the reflective polarization layer.

In some embodiments, the reflectivity of the display device can be improved by providing a reflective thin film transistor (TFT) substrate as part of the image display portion and positioning the reflective TFT substrate between a mirror liquid crystal layer and an image liquid crystal layer. The reflective TFT substrate includes a plurality of lines formed with at least one of aluminum and silver.

References are made to the accompanying drawings that form a part hereof, and in which is shown by way of illustration of the embodiments in which the methods and systems described herein may be practiced.

While the embodiments described herein are directed to a display device with a liquid crystal display, it will be appreciated that the embodiments described herein can be used with other image displays such as an organic light emitting diodes (OLED) display, etc.

[First Embodiment]

Figure 1A:
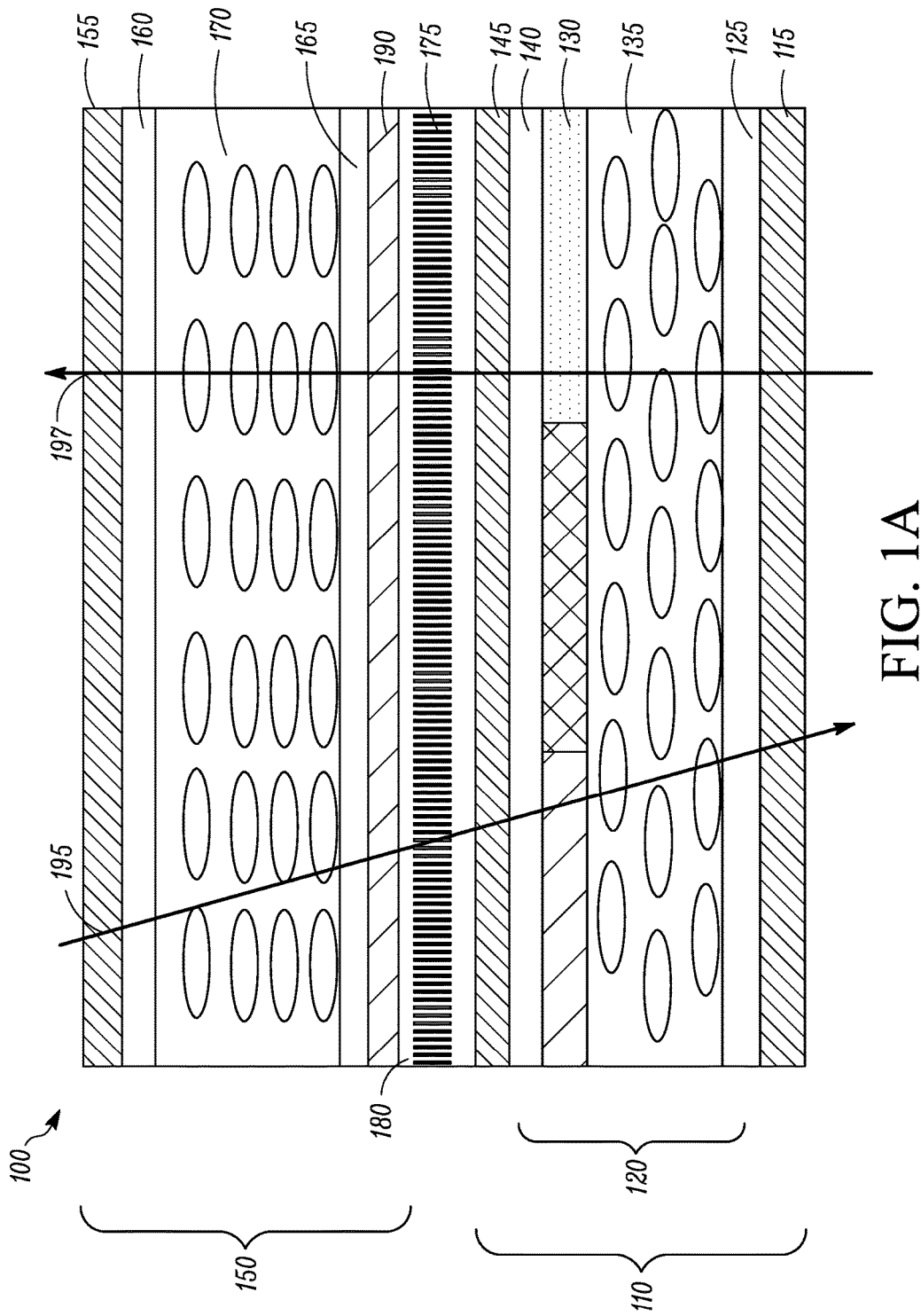
FIGS. 1A and 1B illustrate cross-sectional views of a display device according to a first embodiment.
Figure 1B:
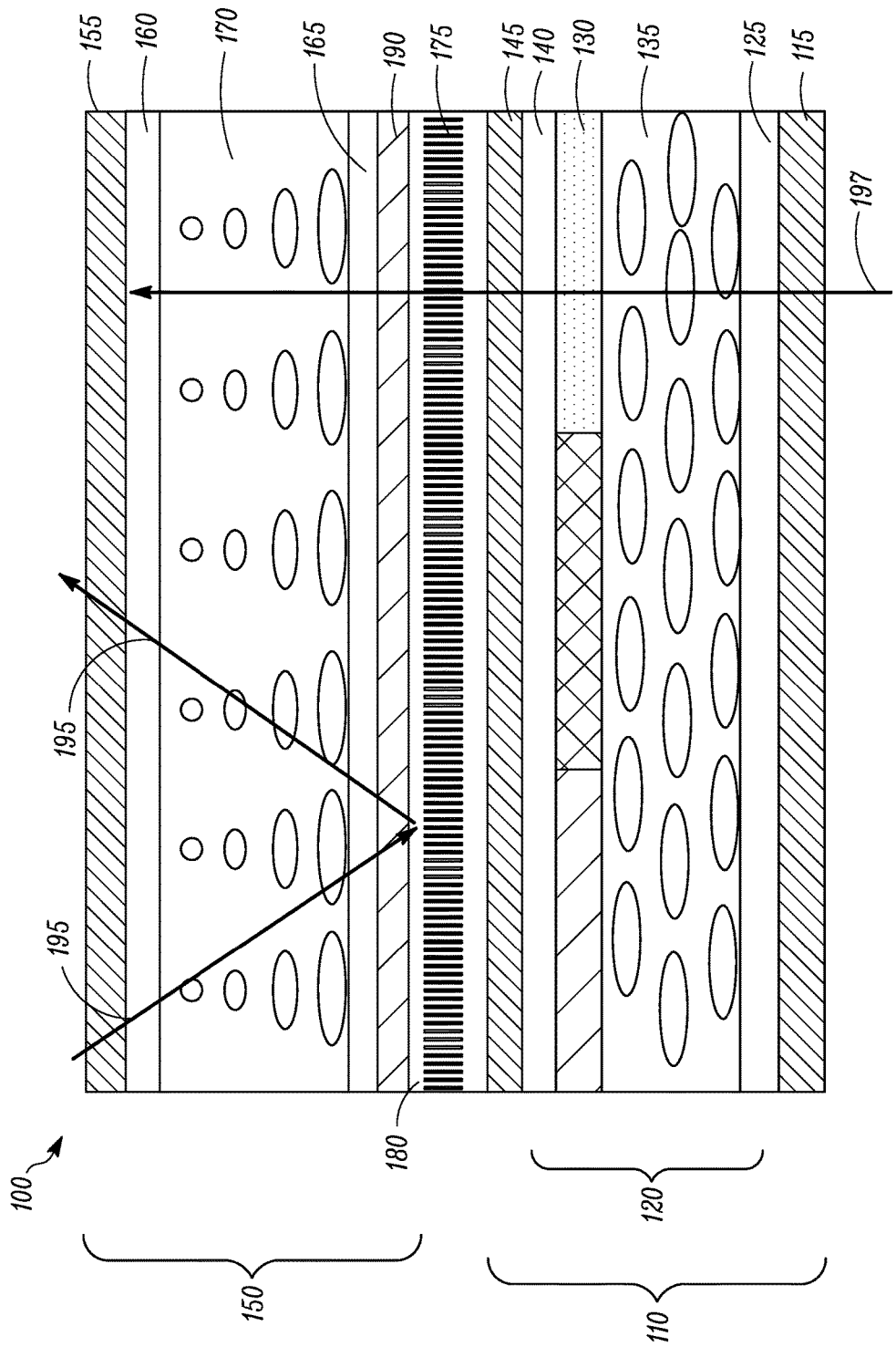

FIGS. 1A and 1B illustrate cross-sectional views of a display device 100 according to a first embodiment. The display device 100 includes an image display portion 110 and a mirror portion 150. The image display portion 110 is capable of emitting image light for displaying a desired image. The mirror portion 150 is superposed on the image display portion 110 and is capable of switching between an image transmittance state and a mirror state. The image transmittance state allows the image light emitted from the image display portion 110 to pass through the mirror portion 150 so that a desired image can be displayed by the display device 100. The mirror state allows outside light entering the display device 100 to be reflected so that a reflected image can be displayed by the display device 100.

The image display portion 110 includes a polarization layer 115 and a display panel 120. The display panel 120 includes a TFT substrate 125 adjacent to the polarization layer 115, a color filter 130 opposed to the TFT substrate 125, an image liquid crystal layer 135, and a glass substrate 140. The TFT substrate 125 and the color filter 130 are disposed between the polarization layer 115 and the glass substrate 140. The TFT substrate 125 includes a glass substrate and TFT layers such as, for example, gate lines, data lines, semiconductor material, various insulating layers and so on. The image display portion 110 also includes a polarization layer 145 adjacent to the glass substrate 140.

The mirror portion 150 includes a polarization layer 155, a first glass substrate 160 adjacent to the polarization layer 155, a second glass substrate 165, a mirror liquid crystal layer 170, and a reflective polarization layer 175. The mirror liquid crystal layer 170 is disposed between the first glass substrate 160 and the second glass substrate 165. In some embodiments, the mirror liquid crystal layer 170 can be a twisted nematic (TN) liquid crystal layer. When the mirror liquid crystal layer 170 is a TN liquid crystal layer, one electrode is formed on the first glass substrate 160 and another electrode is formed on the second glass substrate 165.

The reflective polarization layer 175 is adhered to the glass substrate 165 by an optical clear material 180. In some embodiments, the optical clear material 180 can be an optical clear adhesive (OCA). In other embodiments, the optical clear material 180 can be an optical clear resin (OCR). Typically, the refractive index of the optical clear material 180 is similar to or the same as the refractive index of the glass substrate 165. Accordingly, a minimal amount of reflection occurs between a boundary between the optical clear material 180 and the glass substrate 165. In some embodiments, the reflective polarization layer 175 can be a dual brightness enhancement film (DBEF).

The display device 100 also includes a reflective enhancement layer 190 to enhance reflectivity of outside light when the display device 100 is operating in the mirror state. The reflective enhancement layer 190 is separate from the reflective polarization layer 175. The reflective enhancement layer 190 is disposed between the display panel 120 and the mirror liquid crystal layer 170. In particular, the reflective enhancement film 190 is disposed between the second glass substrate 165 and the reflective polarization layer 175. The reflective enhancement layer 190 has a refractive index that is different from the refractive index of the second glass substrate 165. In some embodiments, the reflective enhancement layer 190 can have a refractive index that is different from the second glass substrate 165 by more than a value of 0.2.

In some embodiments, the reflective enhancement layer 190 can be a semi-transparent reflective film that can increase reflectivity of outside light directly. The semi-transparent reflective film can be made of a metal such as, for example, aluminum or silver. The semi-transparent reflective film can have a thickness between 5 nm and 20 nm.

In other embodiments, the reflective enhancement layer 190 can be a transparent film that can increase reflectivity of outside light at a boundary between the reflective enhancement layer 190 and the second glass substrate 165 or the optical clear material 180. The transparent film can be made of, for example, indium tin oxide (ITO) or silicon nitride (SiN). In these embodiments, the second glass substrate 165 can have a refractive index of 1.5 to 1.6, the optical clear material 180 can have a refractive index of about 1.5. The transparent film can have a refractive index of about 1.85 when formed of indium tin oxide or about 1.0 when formed of silicon nitride. In these embodiments, the transparent film can have a thickness between 80 nm and 150 nm. In some embodiments, the transparent film can have a thickness of 140 nm. It has been found that these thickness ranges can allow green light to be more effectively reflected, thereby increasing the reflectivity of the display device 100. It has also been found that by increasing the thickness of the transparent film can modify the reflected light off of the reflective enhancement layer 190 to take on an increased yellow color.

It will be appreciated that a viewer views the display device 100 from the second polarization layer 155 side (the top side shown in FIGS. 1A and 1B). In operation, the mirror portion 150 and the image display portion 120 work in tandem to operate in the image display state and the mirror state.

When the display device 100 is operating in the image display state as shown in FIG. 1A, the mirror portion 150 is switched off (e.g., a voltage is not applied to the liquid crystal molecules of the mirror liquid crystal layer 170) to allow image light (shown by arrow 197) to be emitted for displaying a desired image. The reflective polarization layer 175 and the second polarization layer 155 are disposed in a cross Nicol arrangement. Image light from the display portion 110 passes through the reflective polarization layer 175, changes its polarization axis so as to be rotated along the twist of the liquid crystal molecules of the mirror liquid crystal layer 170, and passes through the second polarization layer 155, whereby a viewer can view an image displayed in the display portion 110. At the same time, outside light (shown by arrow 195) entering the mirror portion 150 passes through the second polarization layer 155, changes its polarization axis so as to be rotated along the twist of the liquid crystal molecules of the mirror liquid crystal layer 170, and passes through the reflective polarization layer 175, thereby preventing a viewer from viewing the mirror image.

When the display device 100 is operating in the mirror state as shown in FIG. 1B, the mirror portion 150 is switched on (e.g., a voltage is applied to the liquid crystal molecules of the mirror liquid crystal layer 170) to prevent image light (shown by arrow 197) from being emitted and to reflect outside light. Image light from the display portion 110 passes through the reflective polarization layer 175, does not change its polarization axis through the mirror liquid crystal layer 170, and is absorbed by the second polarization layer 155, thereby preventing a viewer from viewing an image displayed in the display portion 110. At the same time, outside light entering the mirror portion 150 passes through the second polarization layer 155, passes through the mirror liquid crystal layer 170 without changing its polarization axis, is reflected on the reflective polarization layer 175, and returns to the same route, whereby a viewer can view the mirror image. In particular, when the display device 100 is in the mirror state, outside light (shown by arrows 195) enters the mirror portion 150 and reflects off both the reflective polarization layer 175 and the reflective enhancement layer 190. In this embodiment, outside light that passes through the reflective enhancement layer 190 can be reflected by the reflective polarization layer 175, thereby enhancing the reflectivity of the display device 100.

[Second Embodiment]

Figure 2:
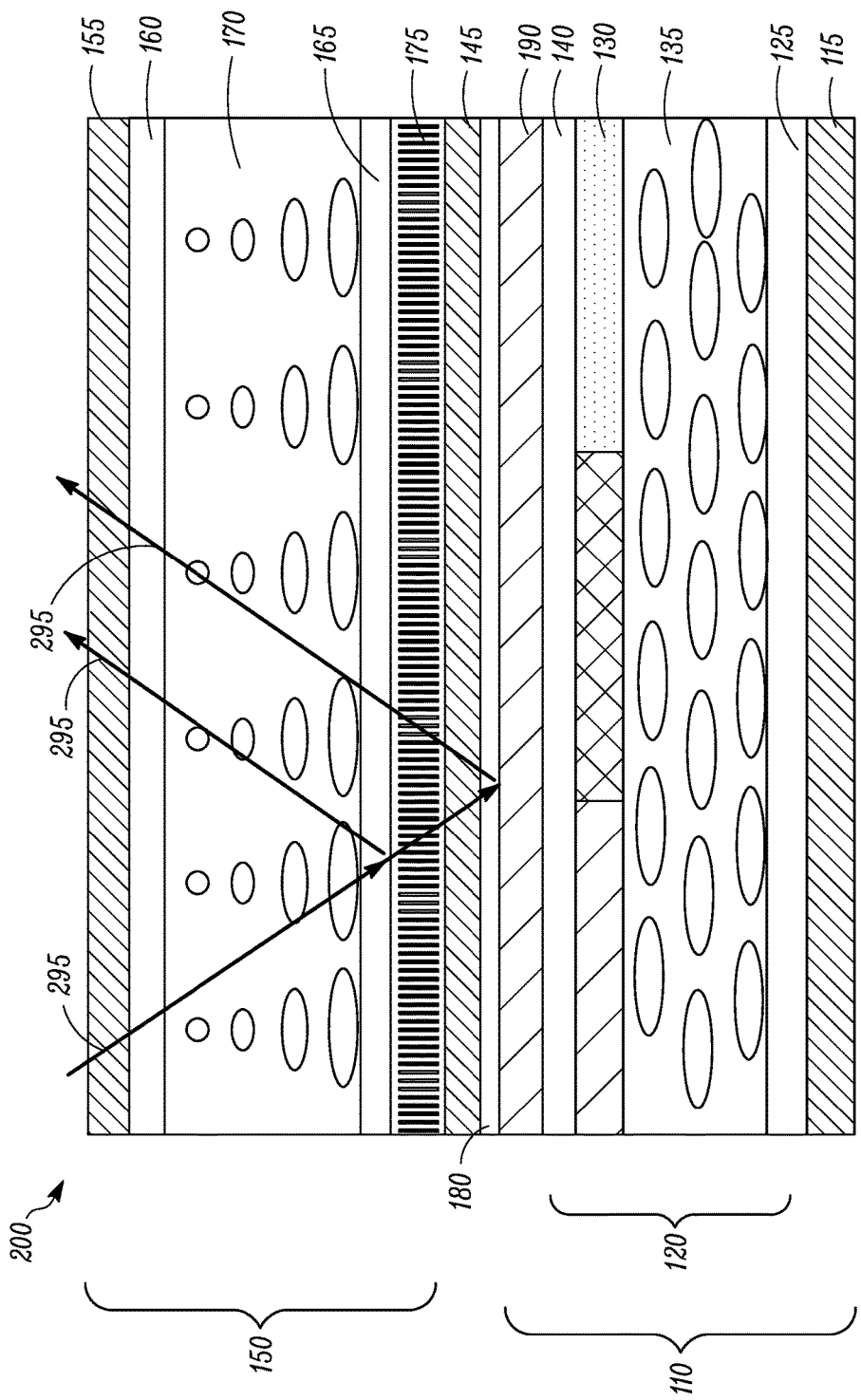
FIG. 2 illustrates a cross-sectional view of a display device according to a second embodiment.

FIG. 2 illustrates a cross-sectional view of a display device 200 according to a second embodiment. The display device 200 is similar to the display device 100 except for the location of the reflective enhancement layer 190. In this embodiment, the reflective enhancement layer 190 is disposed between the display panel 120 and the reflective polarization layer 175. In particular, the reflective enhancement layer 190 is formed on the glass substrate 140.

It will be appreciated that a viewer views the display device 200 from the second polarization layer 155 side (the top side shown in FIG. 2). In operation, the mirror portion 150 and the image display portion 120 work in tandem to operate in the image display state and the mirror state.

Operation of the image display state and the mirror state according to the second embodiment is the same as operation of the image display state and the mirror state according to the first embodiment. Features of the second embodiment different from the first embodiment are as follows.

In particular, when the display device 200 is in the mirror state, outside light (shown by arrows 295) enters the mirror portion 150 and reflects off both the reflective polarization layer 175 and the reflective enhancement layer 190. In this embodiment, outside light that passes through the reflective polarization layer 175 can be reflected by the reflective enhancement layer 190, thereby enhancing the reflectivity of the display device 200.

[Third Embodiment]

FIGS. 1 and 2 illustrate two different embodiments for improving the reflectivity of the display devices 100, 200 by providing the reflective enhancement layer 190 that is separate from a reflective polarization layer 175. FIG. 3 below illustrates another embodiment for improving the reflectivity of a display device 300 by providing a reflective TFT substrate 325 rather than the reflective enhancement layer 190 used in the embodiments of FIGS. 1 and 2.

The display device 300 includes an image display portion 310 and a mirror portion 350. The image display portion 310 is capable of emitting image light for displaying a desired image. The mirror portion 350 is superposed on the image display portion 310 and is capable of switching between an image transmittance state and a mirror state. The image transmittance state allows the image light emitted from the image display portion 310 to pass through the mirror portion 350 so that a desired image can be displayed by the display device 300. The mirror state allows outside light entering the display device 300 to be reflected so that a reflected image can be displayed by the display device 300.

The image display portion 310 includes a first polarization layer 315 and a display panel 320. The display panel 320 includes a reflective TFT layer 325, a color filter 330, and an image liquid crystal layer 135 disposed between the color filter 330 and the reflective TFT layer 325. The image display portion 310 also includes a second polarization layer 345. The reflective TFT layer 325 and the color filter 330 are disposed between the first polarization layer 315 and the second polarization layer 345. Also, the image display portion 310 includes a first glass substrate 340 disposed between the reflective TFT layer 325 and the mirror portion 350, and a second glass substrate 317 disposed between the color filter 330 and the first polarization layer 315.

The reflective TFT layer 325 is a TFT layer includes a plurality of lines (including, for example, gate lines) formed with a metal such as, for example, aluminum and/or silver. As shown in FIG. 3, the reflective TFT layer 325 is positioned to be closer to the mirror portion than the color filter 330. Also, the reflective TFT layer 325 is positioned between the mirror liquid crystal layer 370 and the image liquid crystal layer 335.

The mirror portion 350 includes a third polarization layer 355, a third glass substrate 360 adjacent to the third polarization layer 355, a fourth glass substrate 365, a mirror liquid crystal layer 370, and a reflective polarization layer 375. The mirror liquid crystal layer 370 is disposed between the third glass substrate 360 and the fourth glass substrate 365. In some embodiments, the mirror liquid crystal layer 370 can be a twisted nematic (TN) liquid crystal layer.

The reflective polarization layer 375 is adhered to the fourth glass substrate 365 by an optical clear material 380. In some embodiments, the optical clear material 380 can be an OCA. In other embodiments, the optical clear material 380 can be an OCR. Typically, the refractive index of the optical clear material 380 is similar to or the same as the refractive index of the fourth glass substrate 365. In some embodiments, the reflective polarization layer 375 can be a DBEF film.

It will be appreciated that a viewer views the display device 300 from the third polarization layer 355 side (the top side shown in FIG. 3). In operation, the mirror portion 350 and the image display portion 320 work in tandem to operate in the image display state and the mirror state.

Operation of the image display state and the mirror state according to the third embodiment is the same as operation of the image display state and the mirror state according to the first embodiment. Features of the third embodiment different from the first embodiment are as follows. In particular, when the display device 300 is in the mirror state, outside light (shown by arrows 395) enters the mirror portion 350 and reflects off both the reflective polarization layer 375 and the reflective TFT substrate 325. In this embodiment, outside light that passes through the reflective polarization layer 375 can be reflected by the reflective TFT substrate 325, thereby enhancing the reflectivity of the display device 300.

With regard to the preceding description, it is to be understood that changes may be made in detail, especially in matters of the arrangement of parts without departing from the scope of the present disclosure. The word "embodiment" as used within this specification may, but does not necessarily, refer to the same embodiment. This specification and the embodiments described are exemplary only. Other and further embodiments may be devised without departing from the basic scope thereof, with the true scope and spirit of the disclosure being indicated by the claims that follow.

The invention claimed is:

1. A device capable of switching between an image display state and a mirror state, the device comprising:
   an image display portion that emits image light for displaying a desired image, wherein the image display portion includes:
      a first polarization layer, and
      a display panel;
   a mirror portion that is superposed on the image display portion and is capable of being switched between an image transmittance state that transmits the image light and a mirror state that reflects outside light, wherein the mirror portion includes:
      a second polarization layer,
      a first glass substrate disposed adjacent to the second polarization layer,
      a second glass substrate,
      a first liquid crystal layer disposed between the first glass substrate and the second glass substrate, and
      a reflective polarization layer adhered to the second glass substrate and disposed between the second glass substrate and the display panel; and
   a reflective enhancement layer separated from the reflective polarization layer, wherein the reflective enhancement layer and the second glass substrate are disposed between the display panel and the first liquid crystal layer, and wherein the reflective enhancement layer has a refractive index that is different from the refractive index of the second glass substrate,
   wherein the reflective enhancement layer is disposed between the second glass substrate and the reflective polarization layer, directly contacts a bottom surface of the second glass facing the reflective polarization layer and adheres to the reflective polarization layer by an optical clear adhesive layer; the reflective enhancement layer is a transparent film made of silicon nitride and increases a reflectivity of the outside light at a boundary between the reflective enhancement layer and the second glass substrate or the optical clear adhesive layer, and
   wherein a thickness of the reflective enhancement layer is bigger than 80 nm and smaller than 150 nm.

2. The device of claim 1, wherein the display panel includes:
   a thin film transistor (TFT) substrate,
   a color filter substrate opposed to the TFT substrate,
   a second liquid crystal layer disposed between the TFT substrate and the color filter substrate, and
   a third glass substrate,
   wherein the TFT substrate and the color filter substrate are disposed between the first polarization layer and the third glass substrate.

3. The device of claim 1, wherein the reflective enhancement layer has a refractive index that is different from a refractive index of the second glass substrate by more than 0.2.

4. The device of claim 1, wherein the first liquid crystal layer is a twisted nematic.

* * * * *